(12) United States Patent
Wang

(10) Patent No.: US 11,911,986 B2
(45) Date of Patent: Feb. 27, 2024

(54) VARIABLE PRESSURE INJECTION MOLD FOR PLASTIC INJECTION MOLDING

(71) Applicant: CHANG YANG MATERIAL CORP., Changhua County (TW)

(72) Inventor: Kuo-An Wang, Changhua County (TW)

(73) Assignee: CHANG YANG MATERIAL CORP., Changhua County (TW)

( * ) Notice: Subject to any disclaimer, the term of this patent is extended or adjusted under 35 U.S.C. 154(b) by 854 days.

(21) Appl. No.: 16/975,388

(22) PCT Filed: Mar. 2, 2018

(86) PCT No.: PCT/CN2018/077874
§ 371 (c)(1),
(2) Date: Aug. 24, 2020

(87) PCT Pub. No.: WO2019/165639
PCT Pub. Date: Sep. 6, 2019

(65) Prior Publication Data
US 2020/0391465 A1  Dec. 17, 2020

(51) Int. Cl.
| | |
|---|---|
| *B29C 44/58* | (2006.01) |
| *B29D 35/00* | (2010.01) |
| *A43B 1/14* | (2006.01) |
| *B29D 35/12* | (2010.01) |

(52) U.S. Cl.
CPC ............ *B29D 35/0018* (2013.01); *A43B 1/14* (2013.01); *B29C 44/58* (2013.01); *B29C 44/588* (2013.01); *B29D 35/122* (2013.01); *B29D 35/128* (2013.01)

(58) Field of Classification Search
CPC ............................. B29C 44/58; B29C 44/588
See application file for complete search history.

(56) References Cited

U.S. PATENT DOCUMENTS

| | | | |
|---|---|---|---|
| 5,989,492 A | 11/1999 | Larsson | |
| 2009/0072436 A1 | 3/2009 | Dean | |
| 2019/0351596 A1* | 11/2019 | Lin | ..................... B29C 45/1706 |
| 2019/0389100 A1* | 12/2019 | Lin | ....................... B29C 44/588 |

FOREIGN PATENT DOCUMENTS

| | | |
|---|---|---|
| CN | 103288334 A | 9/2013 |
| DE | 60025949 T2 | 8/2006 |
| FR | 2846271 A1 | 4/2004 |
| JP | H08252844 | * 10/1996 |
| JP | H0976213 A | 3/1997 |
| JP | H09-109292 A | 4/1997 |
| JP | H11-179750 A | 7/1999 |
| JP | 2004261961 | * 9/2004 |
| JP | 2007176053 | * 7/2007 |
| JP | 2018-023755 A | 2/2018 |

* cited by examiner

*Primary Examiner* — Edmund H Lee
(74) *Attorney, Agent, or Firm* — CKC & Partners Co., LLC

(57) ABSTRACT

A variable pressure injection mold, an injected shoe material, and a method for manufacturing the same are provided. The variable pressure injection mold for plastic injection molding includes a mold body and a variable pressure air discharge layer. The mold body has a foam molding space. The variable pressure air discharge layer is arranged on the mold body and is correspondingly exposed to the foam molding space. A plurality of variable pressure pores are provided in the variable pressure air discharge layer and the variable pressure pores connect the foam molding space.

5 Claims, 7 Drawing Sheets

VARIABLE PRESSURE INJECTION MOLD FOR PLASTIC INJECTION MOLDING

RELATED APPLICATIONS

This application is a continuation of International application No. PCT/CN2018/077874, filed Mar. 2, 2018, which is herein incorporated by reference.

BACKGROUND

Technical Field

The invention relates to a variable pressure injection mold, an injected shoe material and a method for manufacturing the same. More particularly, the invention relates to a variable pressure injection mold, an injected shoe material and a method for manufacturing the injected shoe material by which a variable pressure balance after a plastic injection can be effectively realized so as to ensure the injected shoe material is accurate in dimensions and does not tend to deform.

Description of Related Art

There are many kinds of shoe materials manufactured by plastic injection molding technology in the current market. The problem of the present plastic injection molding technology is that materials deform after molding. For this reason, manufacturers have to do repair and further treatment after molding or discard defective products which cannot be repaired. The most important reason resulting in the aforementioned problem is that the flow of an injection raw material sheet is unbalanced due to fluctuations of temperature and pressure in the mold. It has been proved by experiments that problem of the unbalanced flow results from asymmetrical sheer distribution phenomena of the injection raw material sheet in a foam molding space occurring during injecting and filling. Fluctuated pressure of the injection raw material sheet, fluctuated density of a melting plastic material and shape fluctuation of a plastic material during molding in each of the foam molding space are consequently arisen. In addition, appearance completeness of a molding compact relates to the design of the foam molding space and further relates to the fluidity of the injection raw material sheet under a molten state caused by heating in the mold.

Thus, there is an improved mold known for solving the aforementioned problem. For the improved mold, a plurality of concavities recessed towards the inner of an upper mold and being slit shape are arranged on the position of a lower foam molding space corresponding to edge of a shoe sole. A plurality of venting pores perforating and connecting the outer of the upper mold are arranged on the top edge of the concavities. An upper flash groove and a lower flash groove both being encircled shape are arranged on the periphery of a upper foam molding space and the lower foam molding space, respectively. An upper cutting portion and a lower cutting portion both being cramped slit shape are formed on one side of the upper flash groove near the upper foam molding space and one side of the lower flash groove near the lower foam molding space, respectively. In conventional technology, an injection raw material sheet placed in a foam molding space has a better fluidity during thermo-foaming molding because of the arranged venting pores and aesthetics of products can be improved because of the arranged upper flash groove and lower flash groove. However, the venting pores are distributed only on the periphery of the upper foam molding space and the lower foam molding space so that variable pressure balance of all surfaces of the injection raw material sheet cannot be realized effectively.

After the injection raw material sheet being molded in the aforementioned conventional technology, a convex waste material will be arisen at the venting pores that results in not only negative effect on product appearance but also higher cost from a need for subsequently mechanical secondary process of the convex waste material.

In addition, for general shoe soles having edges, concavities recessed towards the inner of a mold and being slit shape are arranged on a position corresponding to a foam molding space of the mold. When an injection raw material sheet is placed in the foam molding space and heated to a molten state, fluidity of the injection raw material sheet is affected by an air which is pressed into the concavities and cannot be discharged so that defective products are produced as well. Furthermore, controlling full quantitation is harder after the injection raw material sheet being placed in the foam molding space and flash is often arisen due to effect of the mold temperature, foaming ratio and other factors. Also, irregular burr is arisen by the flash and easier to stick on fringe of the shoe soles that is inconvenient to treat.

SUMMARY

According to one embodiment of structure aspect of the invention, a variable pressure injection mold for plastic injection molding is provided. The variable pressure injection mold includes a mold body and a variable pressure air discharge layer. The mold body has a foam molding space. The variable pressure air discharge layer is arranged on the mold body and correspondingly exposed to the foam molding space. A plurality of variable pressure pores are provided in the variable pressure air discharge layer. The variable pressure pores connect the foam molding space.

In some examples of the aforementioned embodiment, a dimension of each of the variable pressure pores in the variable pressure air discharge layer can be 100 µm~300 µm. A cooling tube can be buried in the mold body or in the variable pressure air discharge layer. The variable pressure pores of the variable pressure injection mold can be distributed in a non-equidistant meshed manner or arrayed in an equidistant parallel manner. The mold body of the variable pressure injection mold can be mounted on side direction of an injection shoe mold system corresponding to a shoe material. The mold body of the variable pressure injection mold can include a base and a solid layer, in which the solid layer is arranged on inner side of the base and the variable pressure air discharge layer is arranged on inner side of the solid layer.

According to one embodiment of product aspect of the invention, an injected shoe material is provided. The injected shoe material is manufactured by the aforementioned variable pressure injection mold. The injected shoe material includes a surface integrally formed a plurality of tiny protrusions corresponding to the variable pressure pores, in which each of a diameter of the tiny protrusions is 100 µm~300 µm.

In some examples of the aforementioned embodiment, the tiny protrusions can be columnar, conical or block-shaped.

According to one embodiment of method aspect of the invention, a method for manufacturing the injected shoe material having the tiny protrusions is provided. The method for manufacturing the injected shoe material having the tiny protrusions includes the following steps: an injection step, a foaming pre-variable pressure step and a molding step. The injection step is to inject a foaming material. The foaming pre-variable pressure step is to place the foaming material in the variable pressure injection mold and to close the variable pressure injection mold and to make an air originally in the variable pressure injection mold pressed into the variable pressure pores so as to auto-regulate and balance internal pressure. The molding step is to heat and foamingly mold the foaming material into the injected shoe material having the tiny protrusions under stable internal pressure.

In some examples of the aforementioned embodiment, in the molding step, the air in the variable pressure injection mold can be pressed into the variable pressure pores when the foaming material is foaming and expanding so as to balance internal pressure again.

DETAILED DESCRIPTION

Several embodiments of the invention will be described with the drawings. For clarity, some practical details will be described below. However, it should be noted that the invention should not be limited by the practical details, that is, in some embodiments, the practical details is unnecessary. In addition, for simplifying the drawings, some conventional structures and elements will be simply illustrated, and repeated elements may be represented by the same labels.

Figure 1:
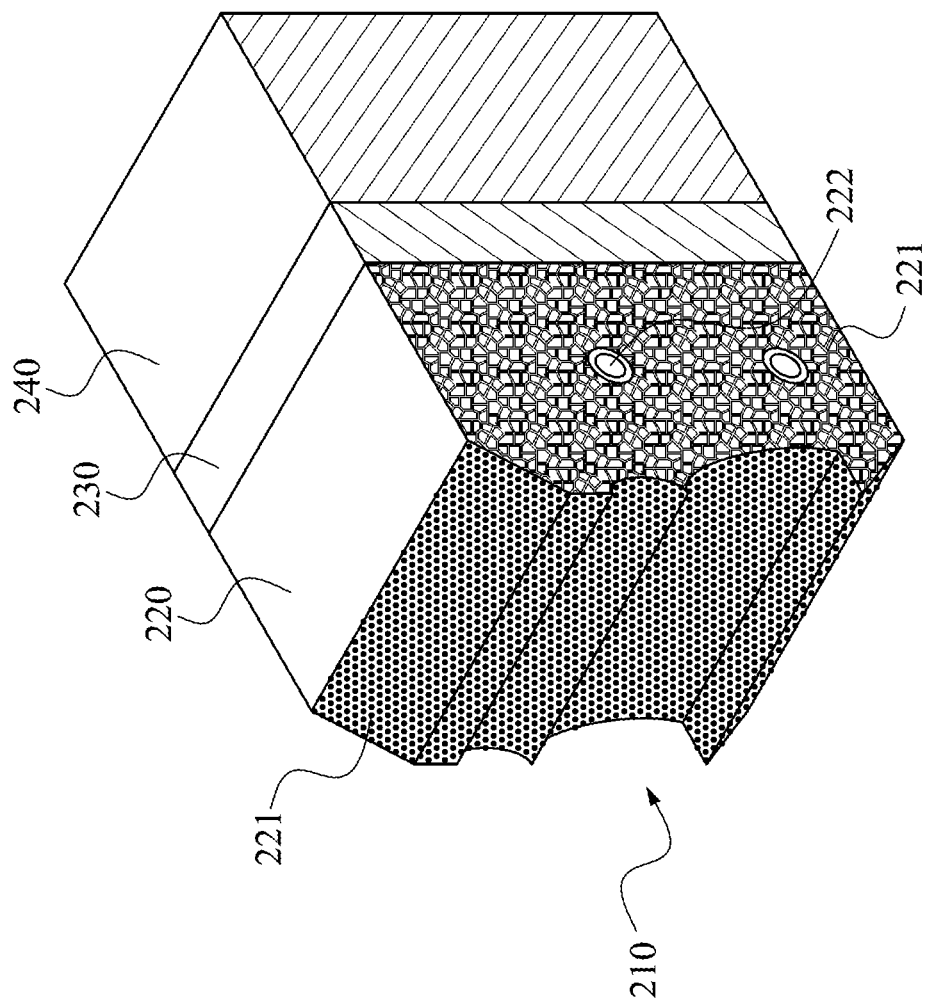
FIG. 1 is a three dimensional cross-sectional view of a variable pressure injection mold of one example of the invention.
Figure 2:
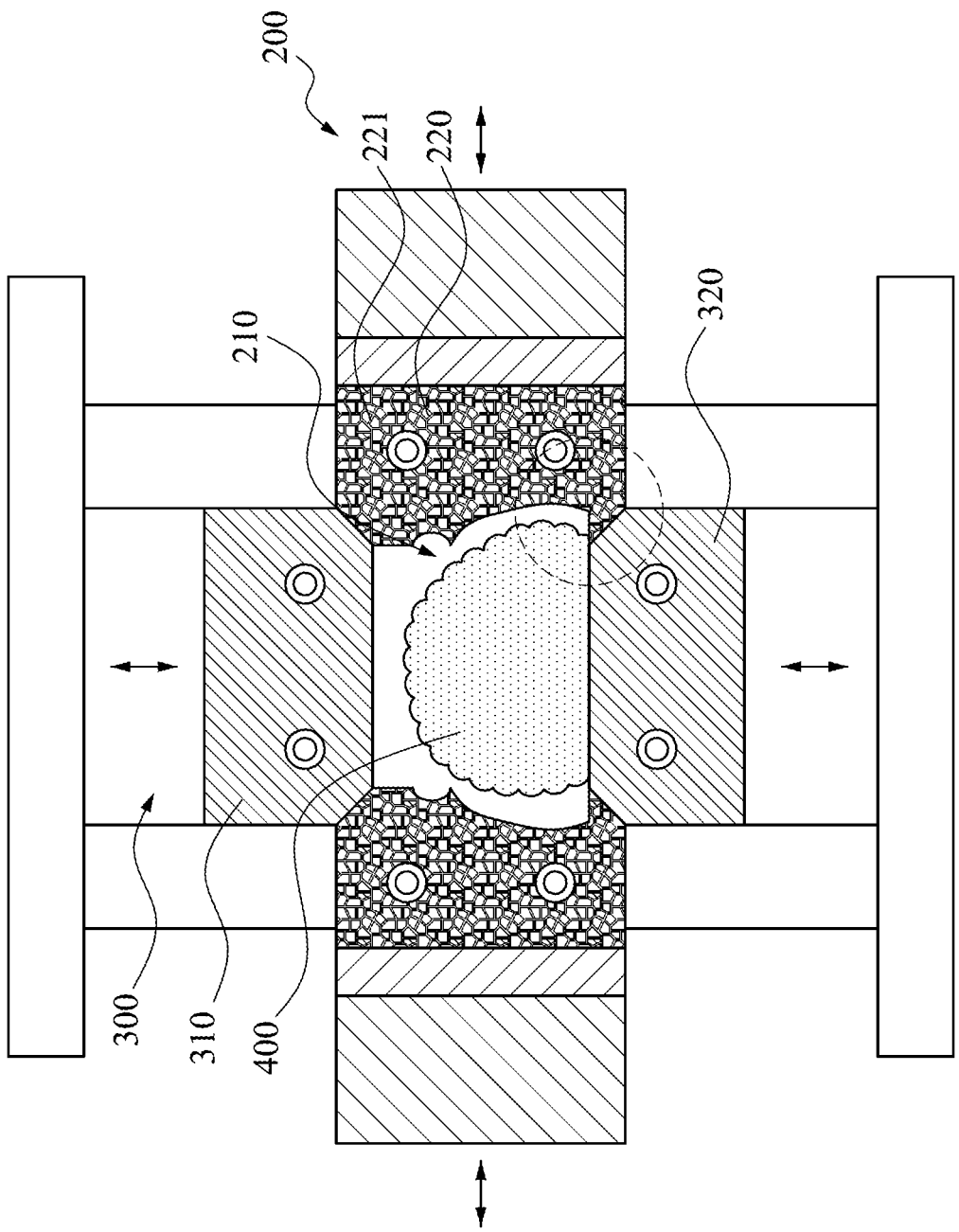
FIG. 2 is an assembling cross-sectional view showing the variable pressure injection mold of FIG. 1 being mounted on an injection shoe mold system.
Figure 3:
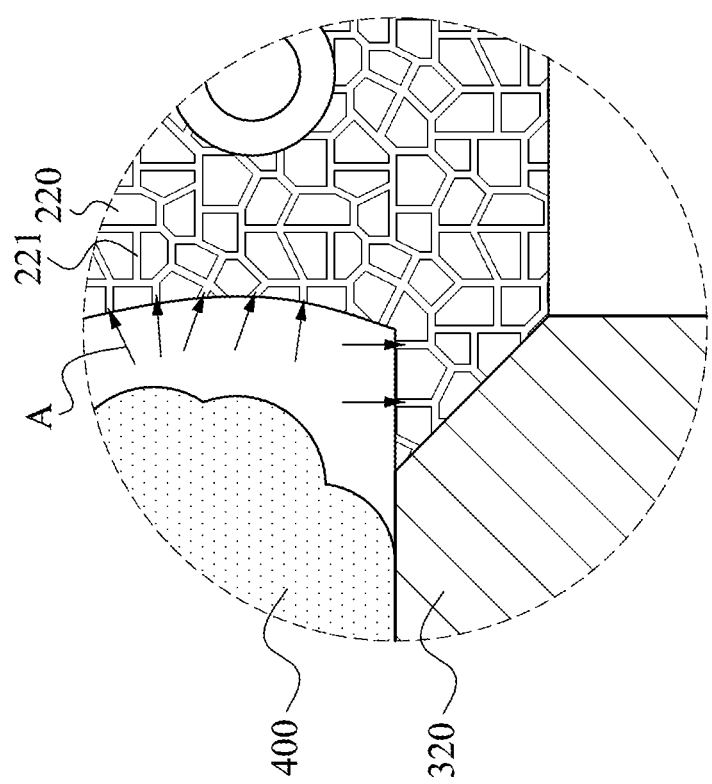
FIG. 3 is a partial schematic view showing a foaming process in the injection shoe mold system of the example of FIG. 2 of the invention.

Please refer to FIG. 1 to FIG. 3. FIG. 1 is a three dimensional cross-sectional view of a variable pressure injection mold 200 of one example of the invention. FIG. 2 is an assembling cross-sectional view showing the variable pressure injection mold 200 of FIG. 1 being mounted on an injection shoe mold system 300. FIG. 3 is a partial schematic view showing a foaming process in the injection shoe mold system 300 of the example of FIG. 2 of the invention. As shown, the example is the variable pressure injection mold 200. The variable pressure injection mold 200 is mounted on the injection shoe mold system 300 and is for performing plastic injection molding. The injection shoe mold system 300 includes an upper mold 310 which is displaceable, a lower mold 320 which is displaceable and a plurality of the variable pressure injection molds 200 which are two, towards side direction and displaceable. The upper mold 310, the lower mold 320 and the variable pressure injection molds 200 can open or close a foam molding space 210. The foam molding space 210 corresponds to the shape of an injected shoe material 410 (please refer to FIG. 5).

In which, each of the variable pressure injection molds 200 includes a mold body (reference number is omitted) and a variable pressure air discharge layer 220. The mold body includes a base 240, a solid layer 230 and a foam molding space 210. The solid layer 230 is arranged on the inner side of the base 240. The variable pressure air discharge layer 220 is arranged on the inner side of the solid layer 230. The foam molding space 210 is on the inner side of the variable pressure air discharge layer 220. A foaming material 400 is placed in the foam molding space 210 and heated so as to be foamingly and expandingly molded. The variable pressure air discharge layer 220 correspondingly exposed to the foam molding space 210. A plurality of variable pressure pores 221 are provided in the variable pressure air discharge layer 220. The variable pressure pores 221 connect the foam molding space 210. A dimension of each of the variable pressure pores 221 of the variable pressure injection mold 200 is 100 μm~300 μm. There are cooling tubes 222 buried in the variable pressure air discharge layer 220 of the variable pressure injection molds 200 so that a cooling fluid can flow therethrough.

The variable pressure pores 221 in the variable pressure air discharge layer 220 of the variable pressure injection molds 200 are made by powder-metallurgy process and distributed in a non-equidistant meshed manner. The mold body of the variable pressure injection molds 200 is mounted on side direction of the injection shoe mold system 300 corresponding to the foam molding space 210. By the aforementioned structure, when the foaming material 400 is placed in the foam molding space 210 of the invention and is going to be heated in order to be foamingly and expandingly molded, the foam molding space 210 is closed first by the upper mold 310, the lower mold 320 and the variable pressure injection molds 200, and the inner side of the variable pressure injection molds 200 towards side direction are closed as well. The foaming and expanding of the foaming material 400 makes an air A originally in the variable pressure injection mold 200 pressed into the variable pressure pores 221 from the foam molding space 210 so as to auto-regulate and balance internal pressure and prevent the air A becoming bubbles or pushing and occupying the corner. Stable internal pressure can be effectively realized because the air A is pressed into the variable pressure pores 221 so that the foaming material 400 of the invention can be stably heated and foamingly molded into the injected shoe material 410 having a plurality of tiny protrusions 441.

It is worth to mention that, the foaming and expanding of the foaming material 400 not only make the air A originally in the variable pressure injection mold 200 pressed into the variable pressure pores 221, but also make an unnecessary residual material during foaming evenly pressed into the variable pressure pores 221 of 100 μm~300 μm in dimension. Also, a surface of the injected shoe material 410 is integrally formed the tiny protrusions 441 having the size corresponding to the variable pressure pores 221, and a diameter of each of the tiny protrusions 441 is 100 μm~300 μm. The tiny protrusions 441 are facilitate to consume the unnecessary residual material during foaming and to strengthen structural strength of the injected shoe material 410 (integrally and outwardly convex structure). Special tactile sense of the tiny protrusions 441 can be used for identifying products or highlighting the pattern shape.

Figure 4:
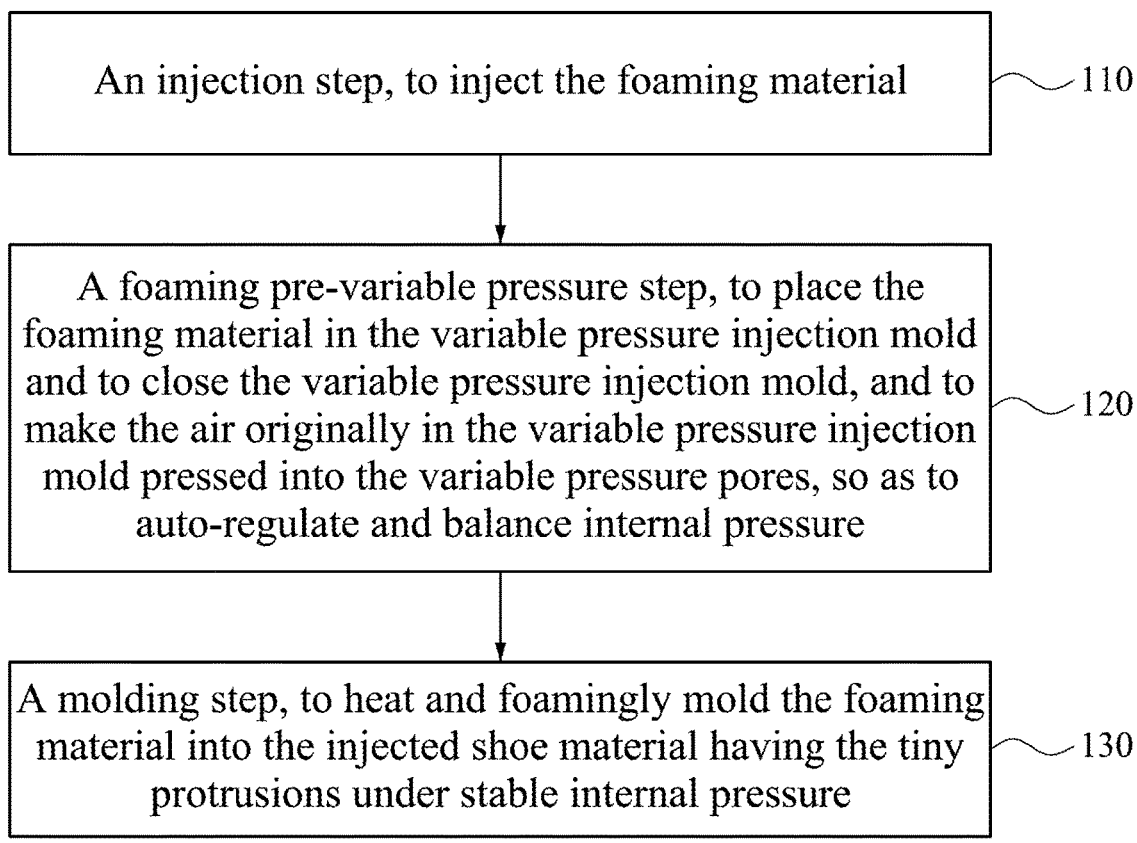
FIG. 4 is a step flow chart of a method for manufacturing an injected shoe material having a plurality of tiny protrusions of one example of the invention.
Figure 5:
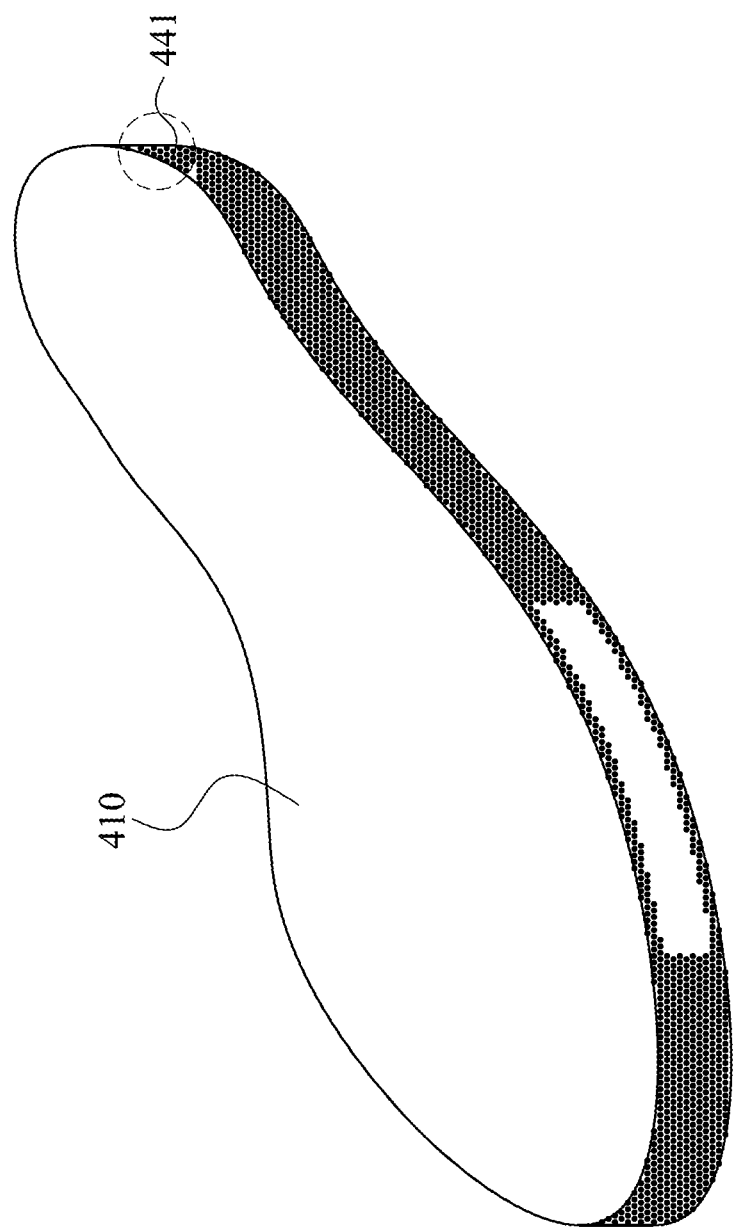
FIG. 5 is a three dimensional appearance view of the injected shoe material of one example of the invention.
Figure 6:
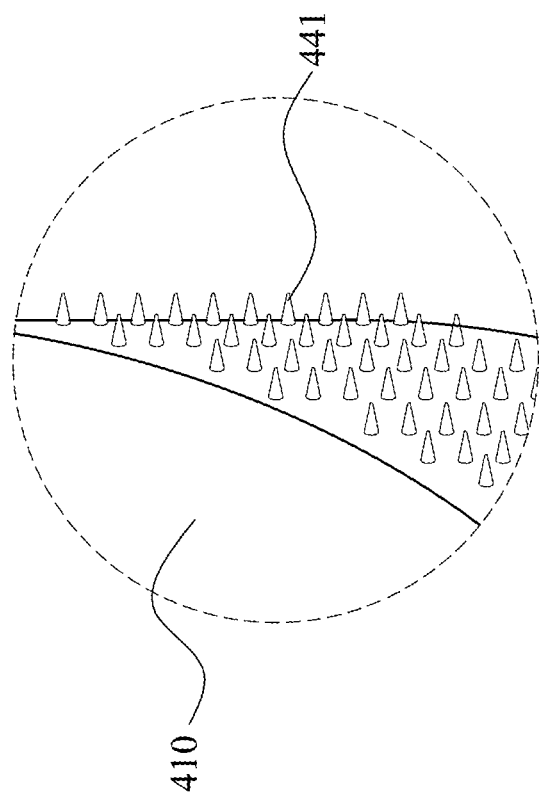
FIG. 6 is a partial enlarged schematic view of a partial structure of the injected shoe material of FIG. 5.

Please refer to FIG. 4 to FIG. 6. FIG. 4 is a step flow chart of a method 100 for manufacturing the injected shoe material 410 having the tiny protrusions 441 of one example of the invention. FIG. 5 is a three dimensional appearance view of the injected shoe material 410 of one example of the invention. FIG. 6 is a partial enlarged schematic view of a partial structure of the injected shoe material 410 of FIG. 5. The method 100 for manufacturing the injected shoe material 410 having the tiny protrusions 441 is provided according to one embodiment of method aspect of the invention. The method 100 includes an injection step 110, a foaming pre-variable pressure step 120 and a molding step 130.

In the injection step 110, the foaming material 400 is injected at first (refer to FIG. 2 to FIG. 3). A certain amount of the foaming material 400 corresponding to the shape of the injected shoe material 410 is placed so that the foaming material 400 can be expandingly and foamingly molded into the injected shoe material 410 after heating.

The foaming pre-variable pressure step 120 is to place the foaming material 400 in the foam molding space 210 and to close the variable pressure injection mold 200. After the foaming material 400 being placed, the air A originally in the foam molding space 210 of the variable pressure injection mold 200 will be pressed into the variable pressure pores 221 so as to auto-regulate and balance internal pressure.

The molding step 130 is to heat and foamingly mold the foaming material 400 under stable internal pressure. As the foaming material 400 expands, the air A originally in the foam molding space 210 of the variable pressure injection mold 200 and the unnecessary residual material are pressed into the variable pressure pores 221 so as to balance internal pressure again and the foaming material 400 is molded into the injected shoe material 410 having the tiny protrusions 411.

Figure 7:
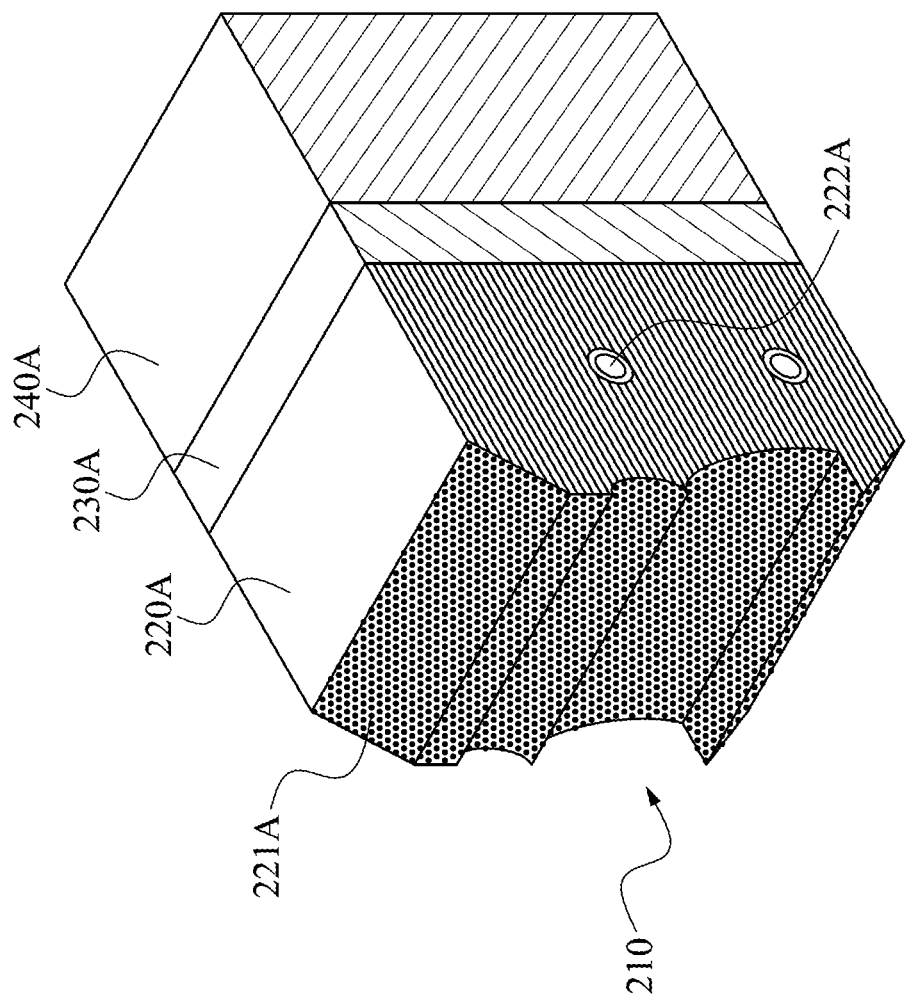
FIG. 7 is a three dimensional cross-sectional view of a variable pressure injection mold of another example of the invention.

Finally, FIG. 7 is a three dimensional cross-sectional view of a variable pressure injection mold 200A of another example of the invention. In which, the variable pressure injection mold 200A includes a mold body (reference number is omitted) and a variable pressure air discharge layer 220A. The mold body includes a base 240A, a solid layer 230A and a foam molding space 210. The solid layer 230A is arranged on the inner side of the base 240A. The variable pressure air discharge layer 220A is arranged on the inner side of the solid layer 230A. The foam molding space 210 is on the inner side of the variable pressure air discharge layer 220A. A foaming material (not illustrated) is placed in the foam molding space 210A and heated so as to be foamingly and expandingly molded. The variable pressure air discharge layer 220A correspondingly exposed to the foam molding space 210. A plurality of variable pressure pores 221A are provided in the variable pressure air discharge layer 220A. The variable pressure pores 221A are arrayed in an equidistant parallel manner. Each of the variable pressure pores 221A connects the foam molding space 210. A dimension of the variable pressure pores 221A of the variable pressure injection mold 200A is 100 µm~300 µm. There are cooling tubes 222A buried in the variable pressure air discharge layer 220A of the variable pressure injection molds 200A so that a cooling fluid can flow therethrough. Other technical details of FIG. 7 are the same as the aforementioned examples, so an explanation in that regard will not be provided again.

According to the aforementioned embodiments, the invention has following advantages. Firstly, auto-regulate and balance internal pressure can be realized and spill of the residual material can be prevented by the variable pressure injection mold of the invention. Secondly, the surface of the injected shoe material of the invention has the tiny protrusions being consistent in shape so that the occurrence of flash needing secondary process can be prevented and structural strength of the injected shoe material can be strengthened by the tiny protrusions. Also, the tiny protrusions provide special tactile impression that brings market identification. Thirdly, the method for manufacturing the injected shoe material having the tiny protrusions of the invention can auto-regulate and balance internal pressure by the foaming pre-variable pressure step so as to ensure the injected shoe material is accurate in dimensions and does not tend to deform; meanwhile, shortages and problems of the conventional technology are solved.

Although the invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the invention without departing from the scope or spirit of the disclosure. In view of the foregoing, it is intended that the invention covers modifications and variations of this disclosure provided they fall within the scope of the following claims.

What is claimed is:

1. A variable pressure injection mold for plastic injection molding, comprising:
    a mold body having a foam molding space; and
    a variable pressure air discharge layer arranged on the mold body and correspondingly exposed to the foam molding space, wherein a plurality of variable pressure pores are provided in the variable pressure air discharge layer, the variable pressure pores connect the foam molding space, and a dimension of each of the variable pressure pores is 100 µm~300 µm;
    wherein the mold body is mounted on side direction of an injection shoe mold system corresponding to a shoe material.

2. The variable pressure injection mold of claim 1, wherein at least one cooling tube is buried in the mold body.

3. The variable pressure injection mold of claim 1, wherein the variable pressure pores are distributed in a non-equidistant meshed manner.

4. The variable pressure injection mold of claim 1, wherein the variable pressure pores are arrayed in an equidistant parallel manner.

5. The variable pressure injection mold of claim 1, wherein the mold body comprises:
    a base; and
    a solid layer arranged on inner side of the base;
    wherein the variable pressure air discharge layer is arranged on inner side of the solid layer.

* * * * *